Jan. 12, 1943.  W. H. OSBORN ET AL  2,307,944
RECOVERY OF METAL SALTS
Filed Aug. 3, 1940  2 Sheets-Sheet 1
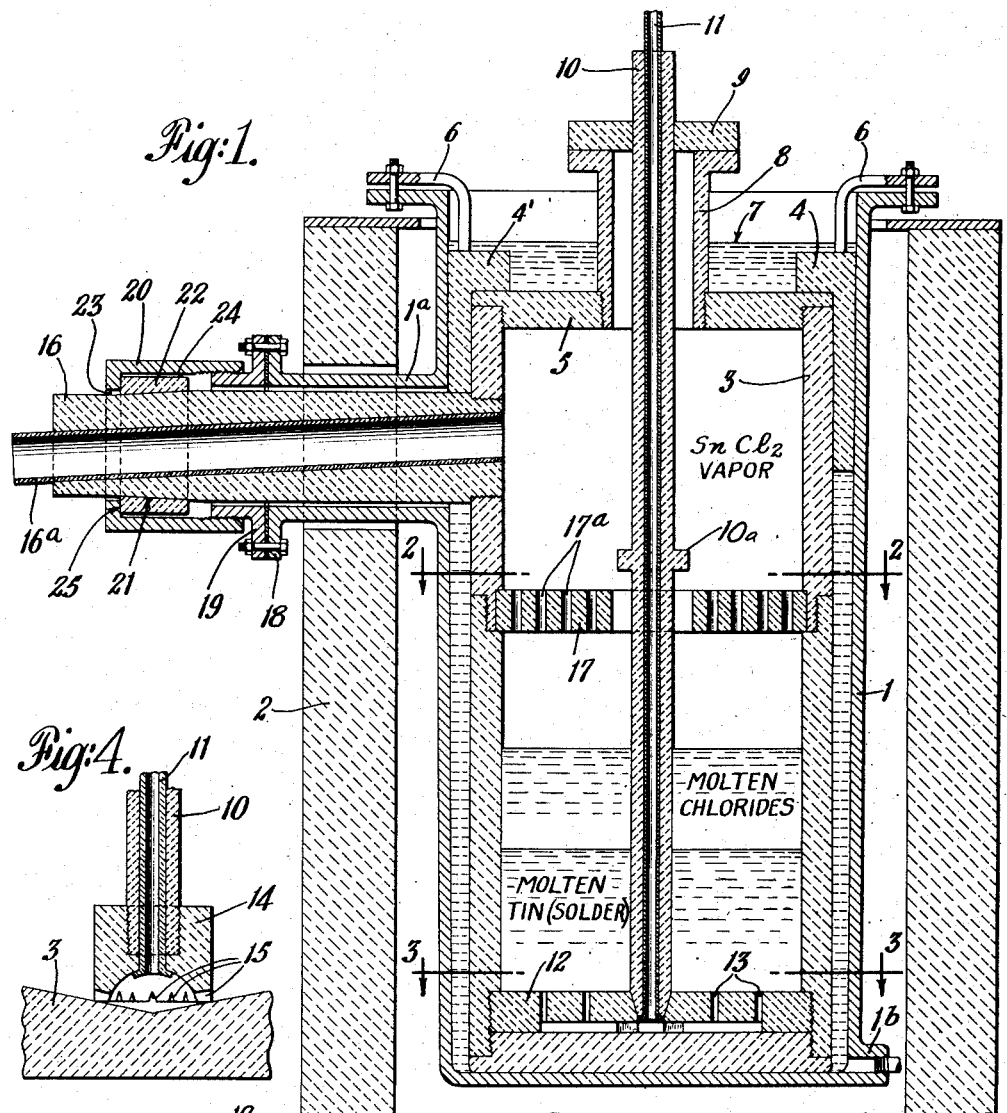
Fig:1.
Fig:4.
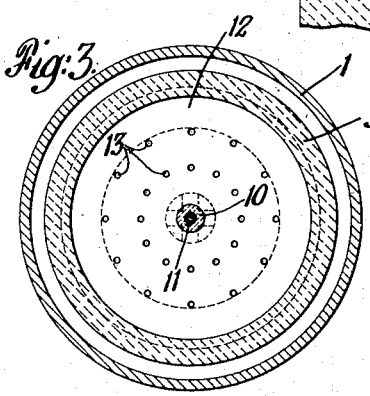
Fig:3.
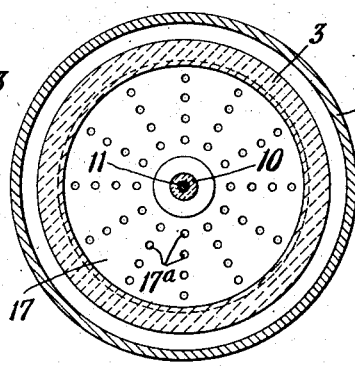
Fig:2.
INVENTORS
WILLIAM H. OSBORN
BY SIDNEY B. TUWINER
JOHN R. SMITH
Paul R. Ames
ATTORNEY Jan. 12, 1943.   W. H. OSBORN ET AL   2,307,944
RECOVERY OF METAL SALTS
Filed Aug. 3, 1940   2 Sheets-Sheet 2

Patented Jan. 12, 1943

2,307,944

UNITED STATES PATENT OFFICE 2,307,944

RECOVERY OF METAL SALTS

William H. Osborn, New York, Sidney B. Tuwiner, Kew Gardens, and John R. Smith, Flushing, N. Y., assignors to Phelps Dodge Corporation, New York, N. Y., a corporation of New York Application August 3, 1940, Serial No. 350,906

11 Claims. (Cl. 75—63)

This invention relates to the recovery and production of a metal salt from and in a mixture thereof with another metal salt and to a process for the separation of metals utilizing such a recovery and production. It may be used, for example, in the recovery and production of tin chloride from and in mixtures thereof with lead chloride and especially as a step in a process for the separation of tin from lead.

In the art of removing lead from molten, metallic tin, liquid stannous chloride may be applied in molten form to the surface of a kettle of tin containing lead and an equilibrium is established between the lead chloride in the stannous chloride and the lead dissolved in the tin. This equilibrium is such that by repeated additions of fresh stannous chloride into a drossing kettle, substantially all of the lead may be removed from the molten tin. For example, by treating successive batches of molten tin metal containing approximately 3 to 4% lead in solution with successive batches of molten stannous chloride, it is possible to obtain final mixed chlorides running 30% or better in lead, and final tin running as low as .003% lead, which tin is of increased value.

Stannous chloride may be separated from the lead chloride dissolved in it by utilizing the difference in boiling points between the two materials, since at atmospheric pressure stannous chloride boils at approximately 1166° F. and lead chloride at approximately 1652° F. However, such a separation by distillation presents difficulties due to the corrosive action of the chlorides and the fact that as the percentage of stannous chloride is reduced in the mixed chlorides, the partial pressure of stannous chloride vapor will be reduced to such an extent that separation by distillation becomes uneconomical, since excessive temperatures or excessive times would have to be used.

It is an object of the present invention to provide an improved method for recovering and producing a metal salt from and in a mixture of such salt with another metal salt. A more specific object is to provide an improved method whereby stannous chloride, or another metal salt, may be distilled from and produced in a mixture thereof with tin chloride, or other metal salt. It is also an object to provide a new cyclic process for the recovery of metals in which such a recovery and production of a metal salt is utilized in the regeneration of the metal salt. More specifically it is an object to provide a cyclic process by which lead may be separated from tin, in which stannous chloride is used to effect the separation and the stannous chloride used in that step is regenerated in and recovered from the mixture of stannous chloride and lead chloride resulting from such separation. It is also an object to recover metallic tin from the alloy as a pure metal and to recover lead as a component of a commercially salable product such as a 50–50 lead-tin solder. Other objects will become apparent.

We have found that when a mixture of stannous and lead chlorides is placed in a suitable distilling vessel over a bath of molten tin, or of a molten mixture containing tin and particularly one containing a predominance of molten tin over molten lead, and a temperature is applied (with or without vacuum or pressure and with or without passage of an inert gas through the liquids) such that the stannous chloride will vaporize, the chloride element of the mixed salts may be removed as stannous chloride vapor. For, as the percentage of stannous chloride in the mixture of chlorides is reduced by vaporization, lead chloride, in excess of that in the equilibrium mixture between lead chloride dissolved in stannous chloride and lead dissolved in tin in the metals of the molten bath, will be converted to lead, which will dissolve in the tin or mixture containing tin, and a corresponding amount of tin will be converted to stannous chloride which will be distilled off as vapor. The course of the reaction, which is illustrated by the reaction equation:

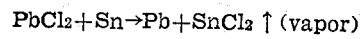
$PbCl_2 + Sn \rightarrow Pb + SnCl_2 \uparrow$ (vapor)

is continuously moved to the right by maintaining the mixture of chlorides over the mixture of metals at such a temperature that the more volatile stannous chloride is continuously removed from the zone of the reaction as a vapor.

Thus by distilling a mixture of lead and tin chlorides over a bath of tin, it is possible to distill substantially all of the chlorine content of the chlorides as stannous chloride and to throw down substantially all of the lead content of the original mixed chlorides as metallic lead. If the amount of tin in the molten bath is just sufficient to satisfy all of the chlorine in the lead chloride, a pure lead may be recovered. Or the amount of tin in the molten bath may be in excess of that required to satisfy the chlorine in the lead chloride and the lead may be recovered as a lead tin alloy that is commercially salable. For example, the amount of tin to be used in the molten bath may be calculated, from the amount of lead chloride in the metal salts to be separated, to give a solder containing 50% lead and 50% tin at the end of the distillation, thus providing, without further cost, a product of commercial value. By this means it is possible to substantially completely separate stannous chloride from lead chloride and to reduce the lead to pure metallic lead or to lead alloyed with tin to form a solder metal, without loss of chlorine.

The temperature of the distillation may be reduced by bubbling an inert gas through the mixture of chlorides to help carry off the stannous chloride vapors at temperatures below the actual boiling point of the stannous chloride. For example, at 1050° F. the partial pressure of the stannous chloride is approximately 340 mm. so at this temperature $$\frac{760-340}{760}$$

times 1 pound-molecule of nitrogen will take off $$\frac{340}{760}$$

pound-molecule of stannous chloride as a vapor.

One of the difficulties presented in the distillation of stannous chloride from a mixture of stannous chloride and lead chloride is in finding a container that will resist the corrosive action of these chlorides at the temperature at which it is necessary to distill the stannous chloride, and also one that will have the required structural strength. We have found that graphite (such as Acheson Graphite electrode material) is resistant to the corrosive action of these mixed chlorides, even at high temperatures, when not exposed to the air at the same time as it is exposed to the chloride. However, the graphite is somewhat permeable to the stannous chloride and therefore cannot be used as a simple externally heated container to carry out the distillation. We have found that if a suitable graphite container is immersed in a bath of molten material, the hydrostatic pressure of the molten material against the external surfaces of the graphite container will prevent to a substantial degree the permeation of the graphite container by liquid chlorides or by the vapors thereof.

Thus, such a graphite container, when immersed in a bath of molten tin or lead or molten mixture thereof, can be satisfactorily used for the distillation of stannous chloride. If the bath of liquid metal surrounding the graphite container is composed of lead or a solder containing relatively large percentages of lead, such stannous chloride as may permeate through the graphite against the hydrostatic pressure of the liquid metal surrounding the graphite, will, in rising through the surrounding bath of liquid solder, pick up lead chloride to arrive at an equilibrium between tin and lead chlorides and tin and lead metal. In view of the excess of lead, the amount of lead chloride in the equilibrium mixture will be such that the melting point of the mixture of stannous and lead chlorides in the surrounding bath will be raised to a point such that as it reaches the surface of the solder bath it will freeze and form a solid crust through which further stannous chloride vapors will not permeate.

An apparatus suitable for carrying out the invention is shown in the drawings, in which Figure 1 is a vertical section on a diameter of the apparatus.

Figure 2 is a horizontal section on the line 2—2 of Figure 1 and Figure 3 is a horizontal section on the line 3—3 of Figure 1.

Figure 4 is a fractional view showing a modified form of the distributor for gas.

Figure 5:
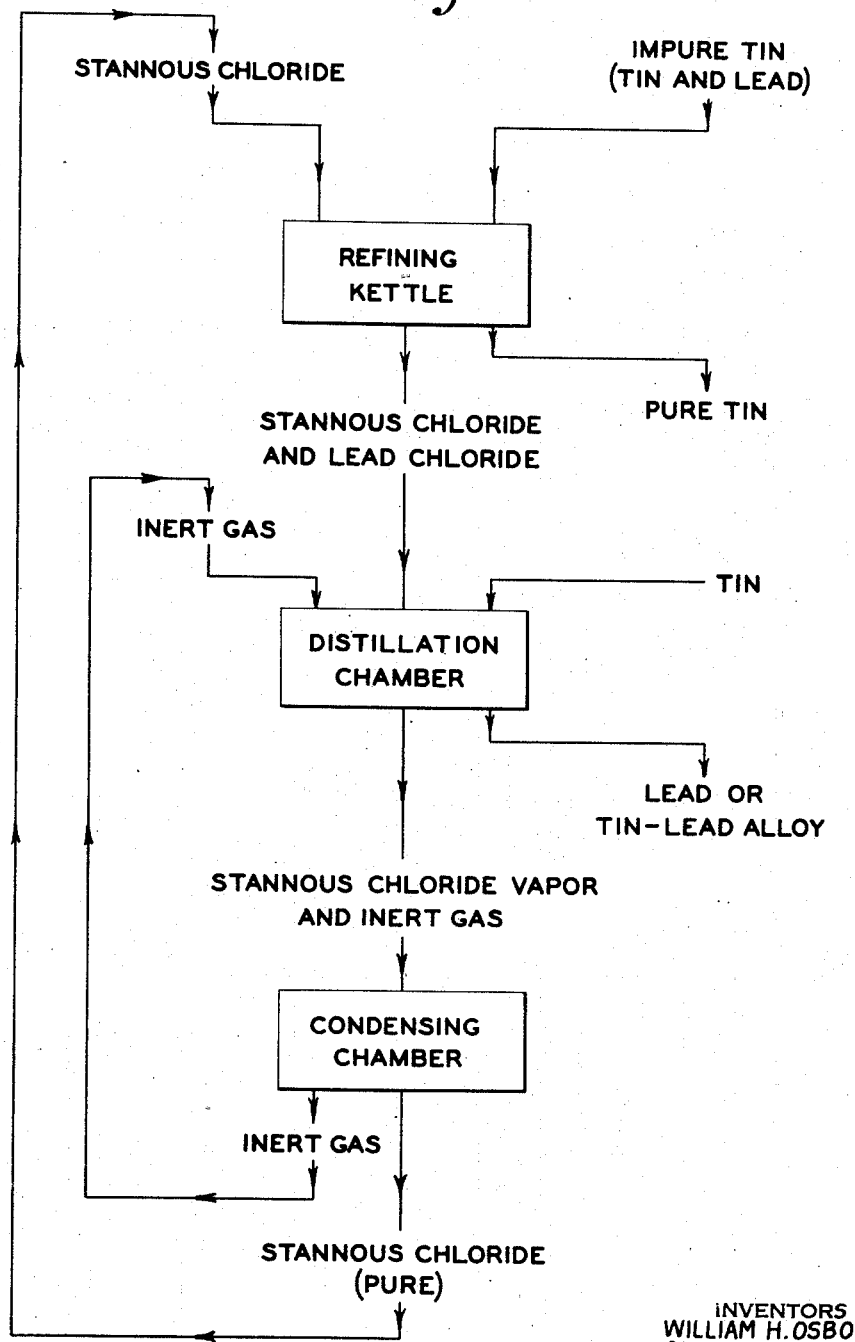
Figure 5 is a flow sheet of the cyclic process of the present invention.

In the drawings, the numeral 1 represents a cylindrical cast iron pot, having a cylindrical flanged outlet tube 1a and a normally closed outlet drain 1b, suspended in a cylindrical furnace chamber 2, of suitable refractory material, which may be heated by gas or electricity, or by other suitable means, to the desired temperature. A graphite crucible 3 is placed in the cast iron pot 1, as illustrated in the drawings, the bottom of the graphite crucible resting upon the bottom of the cast iron pot and the walls of the crucible being spaced from the walls of the pot to leave an annular receptacle therebetween. The crucible 3 may be maintained in its proper spaced position by a number of graphite blocks 4 and 4' positioned around the circumference of the crucible, each having a portion adapted to extend into the annular space and a flange adapted to extend over the graphite top 5 of the crucible. A number of metal stops 6, 6, which are bolted to a flange of the cast iron pot 1, serve to prevent the graphite crucible from floating in the molten liquid, the liquid level being indicated at 7.

A graphite pipe nipple 8 is screwed or otherwise fastened to the top 5 and extends above the surface of liquid metal in the pot 1. This pipe nipple is provided with a cover 9 through which there projects a graphite tube 10, lined with a silica or quartz tube 11, which reaches nearly to the bottom of the graphite crucible, and is there connected by a taper-fit connection to a distributing plate 12 having perforations 13, which will permit the distribution of gases carried through the tube 11 as completely as required, into the molten metals and chlorides in the crucible 3. Other means for distributing the gas may be provided. For example, as illustrated in Figure 4, the tubes 10 and 11 may extend into a header 14 provided with a cupped portion at the bottom with notches 15 through which the gases may escape into the molten mass along the inclined bottom of the crucible 3. Obviously other types of distributors may be substituted for the above.

A discharge pipe 16 made of graphite, and having a silica or quartz tube lining 16a, is screwed or otherwise attached to the graphite crucible 3, so that the stannous chloride vapors may pass out through this discharge pipe into a condensing chamber (not shown) to which it may be attached.

The crucible 3 is provided with a baffle plate 17 having apertures 17a so that any splash from the bubbling of the gas through the liquid, which is confined in the space between the baffle plate 17 and the distributing plate 12, will not be carried off into the discharge tube along with the stannous chloride. A flange 10a is provided on the tube 10 to serve as a baffle opposite the opening at the center of the baffle plate 17.

The crucible should be sufficiently nonporous to prevent flow of the molten materials through it and the upper portions, which contact directly with the vapors and which are opposed by less hydrostatic head of the surrounding molten metals, are preferably of finer grain and so are substantially impervious to the vapors of stannous chloride at atmospheric pressure.

In order to form a seal for the liquid material with which the pot 1 is filled, the outlet tube 1a of that pot is provided with a flange 18, which is bolted to a flanged sleeve or coupling 19 threaded so that the metal sleeve 20 may be adjustably screwed to it. The outer end portion of the graphite pipe 16 is provided with a section having a conical taper, as illustrated at 21, over which is slipped the sliding ring 22, also made of graphite. Substantial clearance is left between the opening in the outer end of the sleeve 20 and the outside of the pipe 16, as illustrated at 23. Substantial clearance is also left between the outside of the graphite sliding ring 22 and the inside of the metal sleeve 20, as illustrated at 24. The annular space between the pipe 16 and the metallic sleeves 19 and 20 is filled with liquid solder, and any tendency of the graphite crucible 3 to rise or fall due to differential expansion between the pot 1 and the crucible 3, or to the tendency of the crucible 3 to float against the stops 6, will cause the sleeve 22 to slide along the vertical plane at 25, perpendicular to the major axis of the pipe 16. Any tendency of the crucible 3 and the pipe 16 to move horizontally due to differential expansion may be accommodated by screwing the sleeve 20 and maintaining sufficient pressure between tapered sleeve 22 and the special coupling 20, and between the contacting surfaces of the sleeve 22 and the pipe 16.

In the apparatus illustrated, the graphite tube 16 is provided with a non-axial conduit which is inclined to the horizontal. If desired, instead of this construction, the pipe 16 may be provided with a conduit having its axis coincident with that of the pipe and the pipe itself may be inclined downwardly. In this event, the pipe may be screwed into the crucible at an angle to give the desired inclination.

As an illustration of the operation of this distilling apparatus, heat may be applied by flame or electricity or by other suitable means in the annular space between the furnace wall 2 and the cast iron pot 1, to heat the latter and its contents to the required temperature to maintain the materials within the pot 1 and crucible 3 in a molten condition. A neutral gas, such as carbon dioxide, or, preferably, moisture-free and oxygen-free nitrogen, may be passed through the silica tube 11 and caused to bubble up through the layer of molten metal and through the layer of molten chlorides which floats on top of it. The stannous chloride vapors distilled from the bath are conducted through the outlet pipe 16 into any conventional form of condensing chamber. In practice, we have found that we can heat the pot to approximately 1050 to 1250° F. and by bubbling through the bath from 3 to 5 pounds of carbon dioxide or moisture- and oxygen-free nitrogen per pound of stannous chloride to be distilled, the stannous chloride can be distilled off substantially completely. For example, with 35 pounds of mixed stannous and lead chlorides, containing 19.6% lead, distilled over a bath of 10.75 pounds of pure tin containing only traces of lead at temperatures of 1250° F. and with carbon dioxide bubbled through at the rate of 5.3 pounds of carbon dioxide per pound of stannous chloride distilled, 28 pounds of stannous chloride were obtained in the condensing chamber containing only .34% lead. The residue in the distilling vessel consisted of 15.9 pounds of metal containing 38.31% lead.

If it is desired to produce a stannous chloride condensate even lower in lead than the example given, the temperature of the bath may be brought down to a lower point that is still above the melting point of the mixed chlorides of the original charge and is sufficiently high to distill the stannous chloride under the pressure conditions existing in the distillation chamber.

In order to remove the solder metal (which is the residual product of the distillation) from the crucible 3 at the end of the run, the tube 11 may be connected to a closed vessel having a capacity at least equal to the solder content of the crucible 3 and communicating with a vacuum pump. By applying vacuum to this pump, the solder may be drawn out of the crucible 3 into this holding vessel. After the solder has been siphoned out, the tube may be disconnected from the collecting vessel and the pipe 10 may be withdrawn from the crucible 3. Molten tin and either solid or molten mixed chlorides may be introduced through the hole in the cover plate 9, and, if necessary, may be melted in the crucible 3 and passed through the perforations 17a into the bottom portion of the crucible 3. When the whole charge is molten, the pipe 10 may be inserted and pressed snugly against the taper in bottom plate 12 and the operation commenced by bubbling gas through the tube 11. The molten metal surrounding the crucible may be introduced through the top of the pot 1 and, when desired, may be siphoned off or withdrawn through the outlet drain 1b. By providing tubes for introducing and withdrawing the molten substances, the distillation may be conducted continuously or intermittently without opening the crucible 3.

Obviously, many variations may be made in the procedure described in adapting it to different uses. For example, the temperatures and pressures of the distillation may be varied to provide the most economical and satisfactory operation. Also, the concentration of the lead in the molten metal bath in contact with the metal salts may be varied to provide a final alloy having the desired proportions of tin and lead.

Although the invention has been described as applied to the separation of tin chloride and lead chloride, it may also be used in the separation of other metal salts and particularly of metal salts of the same negative element or radical. For example, it may be used in the separation of stannous iodide from lead iodide.

When the invention is used for the separation of other substances, it may be desirable to use other molten metals or other high boiling molten substances in place of the lead-tin solder for the bath surrounding the crucible 3 and it is not intended to preclude such uses.

Many variations may also be made in the apparatus in adapting it to other operations. For example, other non-corrosive materials may be used in place of the graphite and other shapes and constructions of the apparatus may be used.

The method described herein may be used with other apparatus capable of withstanding the corrosive action of the metal salts. Also, the apparatus may be used to advantage in carrying out other processes in which the permeability of the vapors present raises a similar problem.

In utilizing the procedure described above in a cyclic process for the separation of tin from lead in which the tin chloride consumed in the separation of lead from tin is regenerated in the second stage of the process, the flow sheet shown in Figure 5 may be followed. The impure tin (containing lead) may be heated until it is molten and stannous chloride added in considerable excess of that required to react with the lead and form metallic tin and lead chloride. After the reaction is completed and the system has reached equilibrium, a mixture of lead chloride with the excess of stannous chloride is obtained as a layer above the molten metallic tin. Lower temperatures are more favorable in promoting this reaction, the freezing point of the molten chlorides being the lower limit.

The chlorides may be separated from the molten metal and regeneration and recovery of the stannous chloride may be brought about by a procedure as described above, wherein the stannous chloride is distilled over a molten bath of pure tin, or tin containing lead or other impurities that are not undesirable in the lead product. The stannous chloride recovered may be used in the further separation of lead from tin and the lead may be recovered in the form of pure lead or in a tin-lead alloy of commercial value.

In the second stage of the operation (i. e., the regeneration and distillation of the stannous chloride), the following are important:

1. A temperature which is preferably maintained as high as the resistance of the reaction container will allow. This favors the reaction and aids in volatilizing stannous chloride.

2. A stream of inert gas passing through the reaction mixture which tends to sweep the stannous chloride from the zone of the reaction.

3. Reasonably good contact between the molten stannous chloride and a bottom layer of molten tin, either initially pure or containing small amounts of lead.

The excess stannous chloride added in the first stage, and the stannous chloride which is regenerated in the second stage, are vaporized and swept along in a moving stream of gas or by ebullition, and condensed to a pure liquid in a condenser, which may be made up of nickel pipe. The stannous chloride recovered in this step may be used again in the first stage of the operation.

The procedure has been described herein as applied to the separation of lead from tin, but it may also be used in the separation of other metals. The terms used in describing and claiming the invention have been used as terms of description and not as terms of limitation and it is intended to include all equivalents of the terms used within the scope of the appended claims.

We claim:

1. A method of recovering a tin halide salt from a mixture of tin halide and lead halide salts, comprising contacting a molten mixture of the salts with a molten bath containing molten tin, maintaining the temperature of the mixture such as to vaporize the stannous halide salt and withdrawing the vaporized stannous halide from the reaction mixture.

2. A method of recovering a tin halide salt from a mixture of tin halide and lead halide salts, comprising contacting a molten mixture of the salts with a molten bath containing molten tin, bubbling an inert gas through the mixture, maintaining the temperature of the mixture such as to vaporize the stannous halide salt and withdrawing the vaporized stannous halide from the reaction mixture.

3. A method of recovering tin chloride comprising adding lead chloride to a molten bath containing molten tin and maintaining the temperature of the mixture such as to vaporize stannous chloride and withdrawing the vaporized stannous chloride from the reaction mixture.

4. A method of recovering stannous chloride from a mixture of stannous chloride and lead chloride, comprising contacting a mixture of the salts with a molten bath containing tin, maintaining the temperature such as to vaporize stannous chloride, and withdrawing the vaporized stannous chloride from the reaction mixture.

5. A method of recovering stannous chloride from a mixture of stannous chloride and lead chloride, comprising contacting a mixture of the salts with a molten bath containing tin, bubbling an inert gas through the mixture, maintaining the temperature such as to vaporize stannous chloride, and withdrawing the vaporized stannous chloride from the reaction mixture.

6. A method of recovering stannous chloride from a mixture of stannous chloride and lead chloride, comprising contacting a mixture of the salts with a molten bath containing tin, bubbling moisture- and oxygen-free nitrogen through the mixture, maintaining the temperature such as to vaporize stannous chloride, and withdrawing the vaporized stannous chloride from the reaction mixture.

7. In the recovery of tin chloride from a mixture of tin chloride with lead chloride, the steps comprising contacting the molten mixture of tin and lead chlorides with a molten tin bath containing sufficient tin to displace the lead in the lead chloride and to form a mixture with the lead, together with any lead in the tin bath, containing about 50% tin and 50% lead, maintaining the temperature such as to vaporize stannous chloride and withdrawing the vaporized stannous chloride from the reaction mixture.

8. In the recovery of pure tin from mixtures of tin and lead, the steps comprising treating the tin-lead mixture with molten stannous chloride, separating the layer of stannous and lead chlorides, contacting the mixture of stannous and lead chlorides with a molten tin bath, maintaining the temperature such as to vaporize stannous chloride, and withdrawing and condensing the vaporized stannous chloride.

9. In the recovery of pure tin from mixtures of tin and lead, the steps comprising treating the tin-lead mixture with molten stannous chloride, separating the layer of stannous and lead chlorides, contacting the mixture of stannous and lead chlorides with a molten tin bath containing sufficient tin to displace the lead in the lead chloride and to form a mixture with the lead, together with any lead in the tin bath, of a predetermined composition, maintaining the temperature such as to vaporize stannous chloride, and withdrawing and condensing the vaporized stannous chloride.

10. In the recovery of pure tin from mixtures of tin and lead, the steps comprising treating the tin-lead mixture with molten stannous chloride, separating the layer of stannous and lead chlorides, contacting the mixture of stannous and lead chlorides with a molten tin bath containing sufficient tin to displace the lead in the lead chloride and to form a mixture with the lead, together with any lead in the tin bath, suitable for use as a solder metal, bubbling an inert gas through the mixture, maintaining the temperature such as to vaporize stannous chloride and withdrawing and condensing the vaporized stannous chloride.

11. A method of recovering tin chloride from mixtures of tin chloride and lead chloride, comprising contacting a molten mixture of the salts with a molten bath containing tin in a graphite vessel surrounded by a molten metal bath containing a preponderance of lead, maintaining the temperature of the mixture such as to vaporize stannous chloride and withdrawing the stannous chloride vapors from the reaction mixture.

WILLIAM H. OSBORN.
SIDNEY B. TUWINER.
JOHN R. SMITH.

CERTIFICATE OF CORRECTION.

Patent No. 2,307,944.  January 12, 1943.

WILLIAM H. OSBORN, ET AL.

It is hereby certified that error appears in the above numbered patent requiring correction as follows: In the grant, line 1, after "New York," insert --and--; line 2, strike out "and JOHN R. SMITH, of Flushing,"; in the heading to the printed specification, line 3, after "New York," insert "and"; line 4, strike out "and John R. Smith, Flushing,"; and in the signature to the printed specification, strike out "JOHN R. SMITH."; and that the said Letters Patent should be read with this correction therein that the same may conform to the record of the case in the Patent Office.

Signed and sealed this 16th day of February, A. D. 1943.

Henry Van Arsdale,
Acting Commissioner of Patents.

(Seal)